(12) United States Patent
Misato

(10) Patent No.: US 7,019,661 B2
(45) Date of Patent: Mar. 28, 2006

(54) AXIAL BEARING WEAR DETECTION DEVICE FOR CANNED MOTOR

(75) Inventor: Hisashi Misato, Hyogo (JP)

(73) Assignee: Kabushiki Kaisha Teikoku Denki Seisakusyo, Hyogo (JP)

( * ) Notice: Subject to any disclaimer, the term of this patent is extended or adjusted under 35 U.S.C. 154(b) by 106 days.

(21) Appl. No.: 10/498,843

(22) PCT Filed: Dec. 18, 2001

(86) PCT No.: PCT/JP01/11082

§ 371 (c)(1),
(2), (4) Date: Jun. 14, 2004

(87) PCT Pub. No.: WO03/052904

PCT Pub. Date: Jun. 26, 2003

(65) Prior Publication Data

US 2005/0012630 A1    Jan. 20, 2005

(51) Int. Cl.
*G08B 21/00*    (2006.01)

(52) U.S. Cl. .................. 340/682; 340/648; 340/686.1; 340/686.3; 73/462; 324/207.16

(58) Field of Classification Search ............... 340/682, 340/686.3, 648; 73/462
See application file for complete search history.

(56) References Cited

U.S. PATENT DOCUMENTS 6,114,966 A * 9/2000 Eguchi ..................... 340/682

6,429,781 B1 * 8/2002 Abe et al. ............... 340/686.3

FOREIGN PATENT DOCUMENTS

| JP | 57-21924 B2   | 5/1982 |
| JP | 08-93681 A    | 4/1996 |
| JP | 09-233769 A   | 9/1997 |
| JP | 10-080103 A   | 3/1998 |
| JP | 11-148819 A   | 6/1999 |
| JP | 2002-197312 A | 7/2000 |
| JP | 2001-231217 A | 8/2001 |

OTHER PUBLICATIONS

Patent Abstracts of Japan for JP2000-197312 published on Jul. 14, 2000.

(Continued)

*Primary Examiner*—Jeffery Hofsass
*Assistant Examiner*—Hoi C. Lau
(74) *Attorney, Agent, or Firm*—Darby & Darby

(57) ABSTRACT

An axial position detection circuit detects the axial position of a rotor from the difference in voltages generated at axial position detection coils disposed at both ends in the axial direction of a stator of a canned motor. An axial zero point adjustment circuit uses a voltage supply, which varies proportionately with the power supply voltage of the canned motor, as a bias power supply to adjust the voltage difference of the axial position detection coils to zero when the rotor is at a reference position in the axial direction. Even if the power supply voltage of the canned motor varies, since the bias power supply of the axial zero point adjustment circuit varies in likewise manner, the zero point adjustment by the axial zero point adjustment circuit is not affected and axial bearing wear detection of high precision is enabled.

3 Claims, 6 Drawing Sheets

OTHER PUBLICATIONS

Patent Abstracts of Japan for JP11-148819 published on Jun. 2, 1999.
Patent Abstracts of Japan for JP08-093681 published on Apr. 9, 1996.
Patent Abstracts of Japan for JP2001-231217 published on Aug. 24, 2001.
Patent Abstracts of Japan for JP09-233769 published on Sep. 5, 1997.
Patent Abstracts of Japan for JP10-080103 published on Mar. 24, 1998.

* cited by examiner

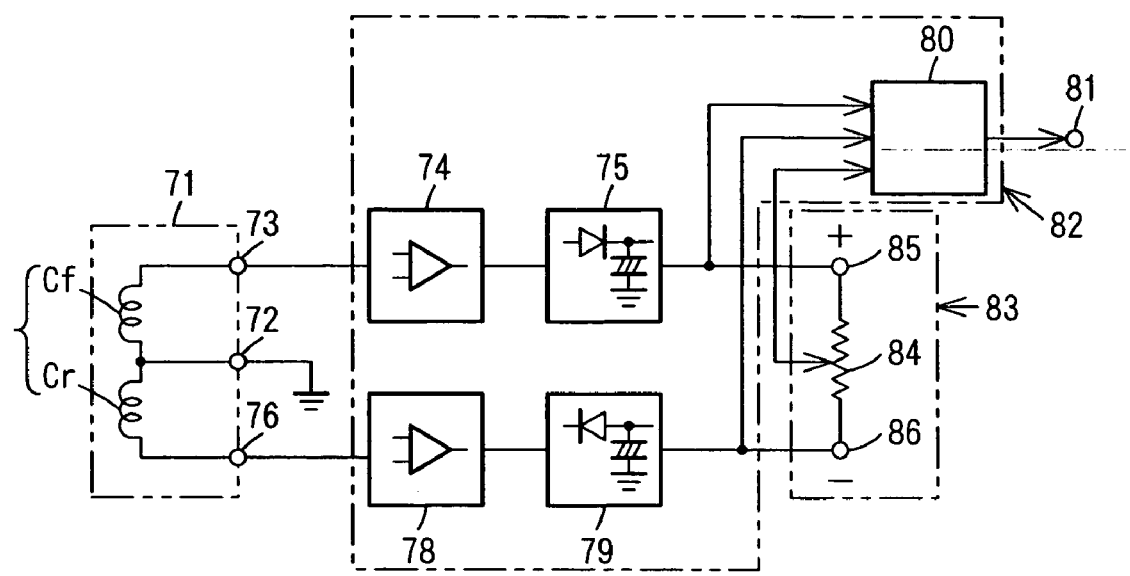
F I G. 1

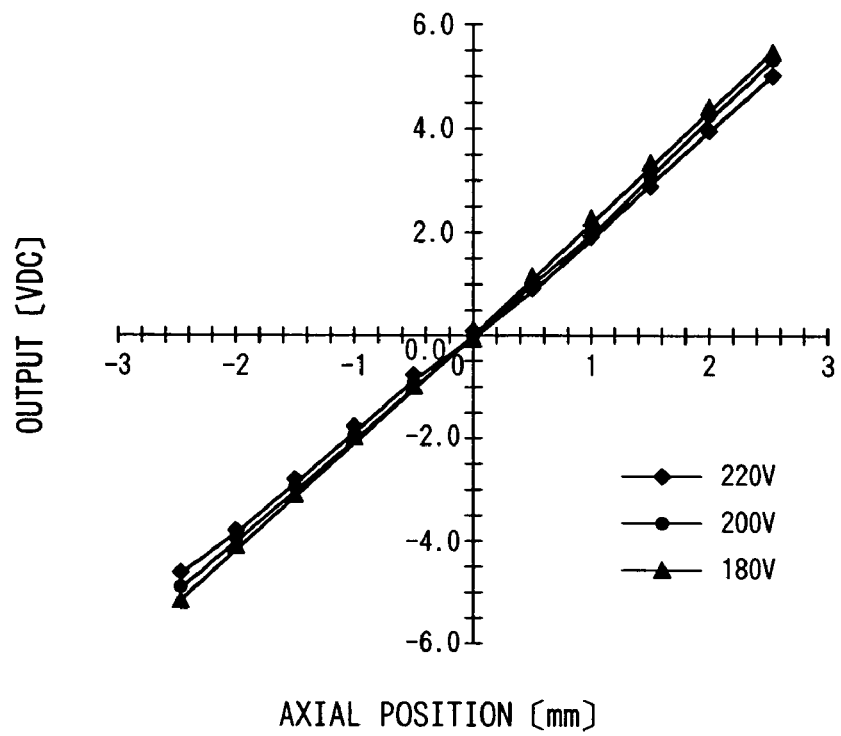
F I G. 5
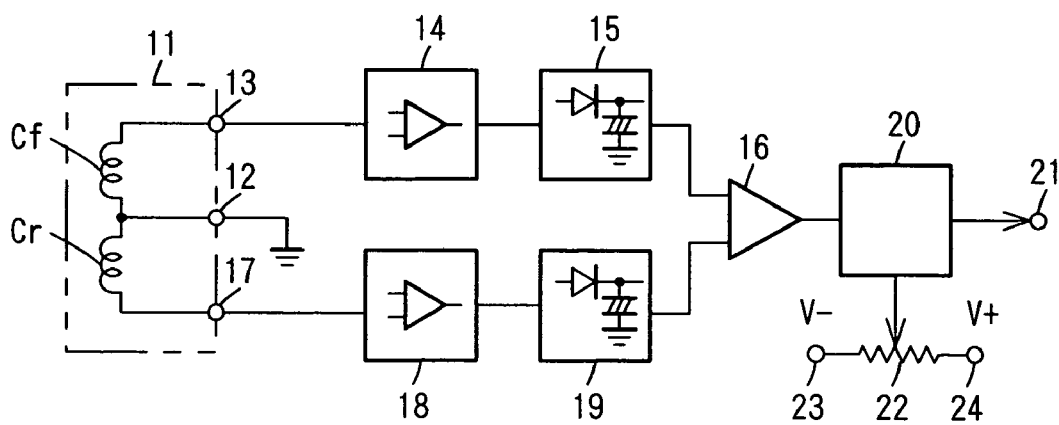
F I G. 6  PRIOR ART

AXIAL BEARING WEAR DETECTION DEVICE FOR CANNED MOTOR

CROSS-REFERENCE TO PRIOR APPLICATION

This is a U.S. national phase application under 35 U.S.C. §371 of International Patent Application No. PCT/JP01/11082 filed Dec. 18, 2001 which is incorporated by reference herein. The International Application was published in Japanese on Jun. 26, 2003 as WO 03/052904 A1 under PCT Article 21(2).

1. Technical Field

This invention concerns an axial bearing wear detection device for detecting bearing wear in the axial direction of a canned motor.

2. Background Art

In general, a canned motor is mainly used for driving a pump and since it is used in a chemical plant, etc., it is required to be high in reliability.

Since a canned motor pump has a leak-less structure in which a canned motor and a pump are integrated, the internal conditions cannot be monitored visually. In many cases, the canned motor's rotor, which rotatingly drives the pump's impeller, is supported by a slide bearing that is lubricated by the pump fluid, and for efficient operation of the canned motor, the wear conditions of the slide bearing must be monitored from the exterior.

Thus as described for example in Japanese Examined Patent Publication No. 57-21924, Japanese Laid-open Patent Publication No. 10-80103, or Japanese Laid-open Patent Application No. 11-148819, an axial bearing wear detection device has been proposed with which axial position detection coils are disposed at both ends in the axial direction of a stator of a canned motor, the axial position of a rotor, which rotates while being supported by a slide bearing, is detected by comparing the difference in the voltages generated at the axial position detection coils, and the amount of bearing wear in the axial direction is estimated from this axial position of the rotor.

FIG. 6 is a circuit diagram of a conventional axial bearing wear detection device.

An axial bearing wear detection device 11 has axial position detection coils Cf and Cr, disposed at the two parts of the front side and rear side of a stator. These axial position detection coils Cf and Cr are connected in series and an intermediate part 12 is grounded. An end part 13 of axial position detection coil Cf at the front side of the stator is connected to one input side of a differential amplifier 16 via an amplifier 14 and a rectifier/smoothing circuit 15, an end part 17 of axial position detection coil Cr at the rear side of the stator is connected to the other input side of a differential amplifier 16 via an amplifier 18 and a rectifier/smoothing circuit 19, and the output side of differential amplifier 16 is connected to an output terminal 21 via an axial zero point adjustment circuit 20.

In order to accurately detect the axial position of a rotor from the difference of the voltages generated at the respective axial position detection coils Cf and Cr, the relationship between the signal of the difference of the voltages generated at the respective axial position detection coils Cf and Cr and the axial position of a rotor must be adjusted, that is, zero point adjustment must be performed, and axial zero point adjustment circuit 20 is provided for this zero point adjustment.

A variable resistor 22 is connected to axial zero point adjustment circuit 20, a negative voltage V− of a constant voltage power supply is connected to one terminal 23 of variable resistor 22, and a positive voltage V+ of the constant voltage power supply is connected to the other terminal 24 of variable resistor 22.

FIG. 7 is a graph showing the relationship between the voltages generated at axial position detection coils Cf and Cr and the axial position of the rotor.

The ordinate axis of this graph indicates the AC output voltages generated at axial position detection coils Cf and Cr and the abscissa axis indicates the axial position of the rotor, with the central 0 mm position indicating the mechanical center position of the rotor, the left negative side indicating the rear side of the canned motor, and the right positive side indicating the front side.

The point at which the curve of the voltage generated at axial position detection coil Cf and the curve of the voltage generated at axial position detection coil Cr intersect is the electrical central position at which the voltages generated at the respective axial position detection coils Cf and Cr are equal. Due to reasons of design or manufacture, a deviation arises between the electrical central position and the mechanical central position, and with the case shown in FIG. 7, there is a deviation of approximately 1 mm.

Thus to adjust the electrical deviation of approximately 1 mm with respect to the mechanical 0 mm central position by means of axial zero point adjustment circuit 20, shown in FIG. 6, the electrical output signal when the rotor is at 0 mm, which is the mechanical central position, is adjusted to be canceled out by the positive and negative power supply V+ and V− of the constant voltage power supply via variable resistor 22.

FIG. 8 is a graph showing how the voltages of FIG. 7, which are generated at axial position detection coils Cf and Cr, vary when the power supply voltage of the canned motor varies.

For example, with respect to the voltages generated at axial position detection coils Cf and Cr when the power supply voltage of the canned motor is 200V, the voltages generated at axial position detection coils Cf and Cr increase when the power supply voltage increases, for example, to 220V, and the voltages generated at axial position detection coils Cf and Cr decrease when the power supply voltage decreases, for example, to 180V. The curves of the voltages generated at the respective axial position detection coils Cf and Cr with respect to the axial position are shown to move substantially in parallel with a variation of the power supply voltage.

FIG. 9 is a graph showing the output when the voltages of FIG. 7, which are generated at axial position detection coils Cf and Cr, are processed by an axial bearing wear detection device that includes the conventional axial zero point adjustment circuit 20 shown in FIG. 6.

By performing zero point adjustment with axial zero point adjustment circuit 20 when the power supply voltage of the canned motor is 200V, the relationship between the axial position of the rotor and the output from output terminal 21 becomes a substantially straight line that passes through 0V when the axial position is 0 mm.

However, when the power supply voltage of the canned motor differs from that during zero point adjustment, that is for example, when the power supply voltage increases to 220V or decreases to 180V, the curve of the output with respect to the axial position moves in parallel, causing the zero position reference to change.

The variation of the difference of the axial position detection coils Cf and Cr for the 0 mm axial position according to the magnitude of the power supply voltage is considered to be a cause of this problem. That is, when the power supply voltage differs from that during zero point adjustment, since the voltages generated at the respective axial position detection coils Cf and Cr vary as shown in FIG. 8, the voltage difference of axial position detection coils Cf and Cr when the rotor is at the 0 mm position changes and will be in accordance with the parallel movement of the output characteristics, such as shown in FIG. 9.

If the output characteristics with respect to axial position are as shown in FIG. 9, in a certain case where the power supply voltage of the canned motor differs from that during zero point adjustment, the axial position reference shifts to either the front side or the rear side so that when the power supply voltage of the canned motor fluctuates, the information that the bearing is worn maybe output when the bearing is actually not worn or the information that the bearing is not worn may be output when the bearing is actually worn.

Thus with the conventional axial zero point adjustment circuit, though a constant voltage is supplied via variable resistor 22 from a constant voltage power supply, which does not vary even when the power supply voltage of the canned motor varies, and variable resistor 22 is adjusted so that the difference of the voltages generated at axial position detection coils Cf and Cr will be zero when the rotor is at the reference position in the axial direction, since the voltages generated at axial position detection coils Cf and Cr are dependent on the power supply voltage of the canned motor and the difference of the voltages generated at axial position detection coils Cf and Cr is also dependent on the power supply voltage of the canned motor, when the power supply voltage of the canned motor becomes a voltage that differs from that during zero point adjustment, erroneous operation occurs such that even if there is no change in the axial position of the rotor, wear of the bearing is detected even though the bearing is not worn or the wear of the bearing is not detected even though the bearing is worn.

This invention has been made in view of this point and an object thereof is to provide an axial bearing wear detection device for canned motor that can perform axial bearing wear detection of high precision even when the power supply voltage of the canned motor varies.

DISCLOSURE OF THE INVENTION

This invention's axial bearing wear detection device for canned motor comprises: axial position detection coils, disposed at both ends in the axial direction of a stator of a canned motor having the stator and a rotor; an axial position detection circuit, detecting the axial position of the rotor with respect to the stator from the difference in the voltages generated at the axial position detection coils; and an axial zero point adjustment circuit, having a power supply source, which varies in proportion to the power supply voltage of the above-mentioned canned motor, as a bias power supply and adjusting to zero the voltage difference of the two axial position detection coils at the above-mentioned axial position detection circuit when the rotor is at a reference position in the axial direction.

With this arrangement, by means of the axial position detection circuit, the movement position in the axial direction of the rotor is detected from the difference in the voltages generated at the axial position detection coils disposed at the respective end parts in the axial direction of the stator. The voltage difference of the two axial position detection coils at the position detection circuit when the rotor is at a reference position in the axial direction is adjusted to zero by means of the axial zero point adjustment circuit that uses a voltage source, which varies in proportion to the power supply voltage of the canned motor, as a bias power supply. Even when the power supply voltage of the canned motor varies, the bias power supply of the axial zero point adjustment circuit varies in the same manner, and thus the zero point adjustment by the axial zero point adjustment circuit is not affected and axial bearing wear detection of high precision is enabled.

Also with this invention's axial bearing wear detection device for canned motor, the voltage generated at least at one of the axial position detection coils is used for the bias power supply of the axial zero point adjustment circuit. By this arrangement, high precision axial bearing wear detection is enabled by a simple circuit arrangement that does not use a separate power supply.

Also with this invention's axial bearing wear detection device for canned motor, the voltage generated at one of the axial position detection coils is used for the positive power supply of the bias power supply of the axial zero point adjustment circuit and the voltage generated at the other axial position detection coil is used for the negative power supply of the bias power supply of the axial zero point adjustment circuit. By this arrangement, high precision axial bearing wear detection is enabled by a simple circuit arrangement that does not use a special power supply.

BRIEF DESCRIPTION OF THE DRAWINGS

FIG. 1 is a circuit diagram of an axial bearing wear detection device for canned motor that is an embodiment of this invention, FIG. 5 is a graph showing the output when voltages generated at the axial position detection coils are processed by the axial bearing wear detection device, FIG. 6 is a circuit diagram of a conventional axial bearing wear detection device.

BEST MODE FOR CARRYING OUT THE INVENTION

An embodiment of this invention shall now be described with reference to FIG. 1 through FIG. 5.

Figure 2:
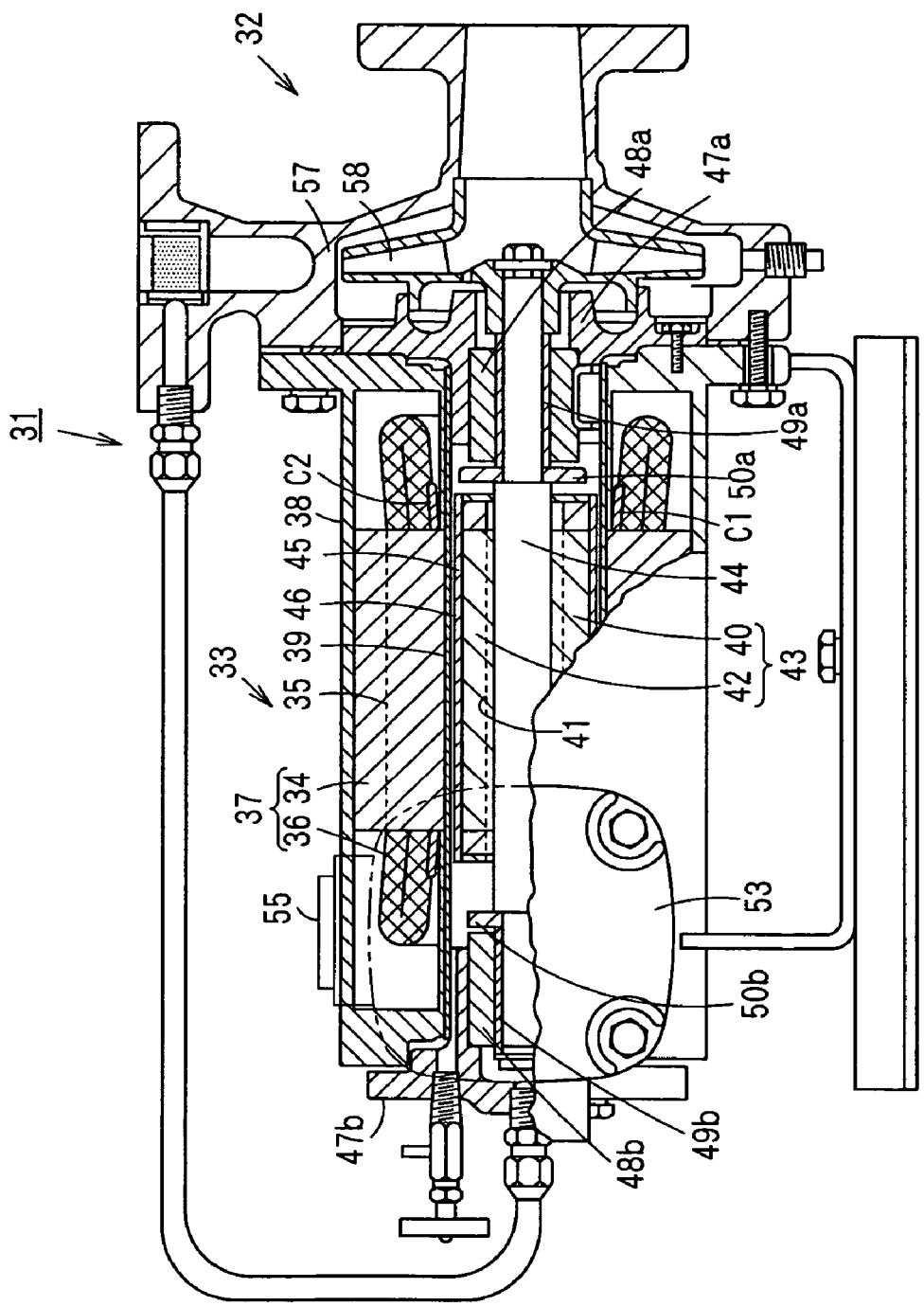
FIG. 2 is a partially cutaway front view of a canned motor pump to which the same axial bearing wear detection device is applied.

FIG. 2 is a partially cutaway front view of a canned motor pump to which an axial bearing wear detection device is applied. 31 is a canned motor pump, and with this canned motor pump 31, a pump 32 and a radial gap type canned motor 33 are joined integrally to each other in a fluid-tight manner.

In canned motor 33, a stator 37, arranged by winding stator winding 36 in stator grooves 35 of a stator iron core 34, is fitted inside a stator frame 38, a stator can 39, formed to a thin cylindrical shape from stainless steel or other non-magnetic material, is inserted in close contact to the inner peripheral surface of stator 37, and the respective end rims of stator can 39 are welded in a fluid-tight manner to stator frame 38. Also, a rotor shaft 44 is fitted into a rotor 43, arranged by attaching a rotor conductor 42 in rotor grooves 41 of a rotor iron core 40, and a rotor can 45, formed to a thin cylindrical shape from stainless steel or other non-magnetic material, is fitted onto the outer peripheral surface of rotor 43. Stator 37 and rotor 43 are disposed so as to oppose each across a can gap 46 between stator can 39 and rotor can 45, and rotor shaft 44 is axially supported by bearings 48a and 48b, which are slide bearings attached to bearing boxes 47a and 47b, and via sleeves 49a and 49b and thrust collars 50a and 50b.

On stator iron core 34 are disposed a pair of radial position detection coils C1 and C2, which are spaced apart by a spatial angle of 180 degrees with respect to the center of stator iron core 34 and each of which is wound around the entirety of one tooth part of stator iron core 34.

Canned motor 33 has a terminal box 53, which is in communication with the interior of stator frame 38, protruding from a part of stator frame 38, and at the upper part of this terminal box 53 is installed a sealed container 55 with an explosion-proof structure provided with a glass peephole. A part of an axial bearing wear detection device, which is included among the operation monitoring devices of canned motor 33, is housed inside this sealed container 55.

Pump 32 has a casing 57, which is mounted in a fluid-tight manner to stator frame 38 of canned motor 33, and an impeller 58, mounted to rotation shaft 44 inside casing 57. Impeller 58 inside pump 32 is rotatingly driven by rotor 43, which is supported by bearings 48a and 48b and via sleeves 49a and 49b, and is restricted in movement in the axial direction by the contact of thrust collars 50a and 50b with bearings 48a and 48b.

Figure 3:
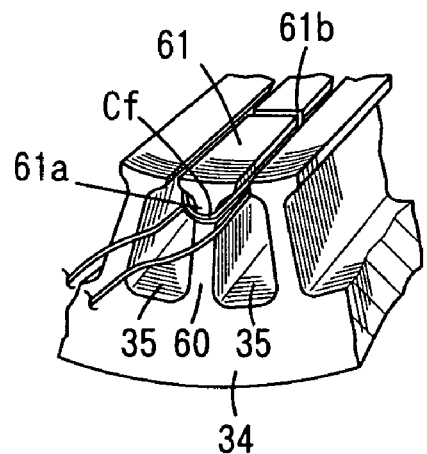
FIG. 3 is a perspective view of a part of the same axial bearing wear detection device at which an axial position detection coil is disposed at an end part of one tooth part of a stator.

FIG. 3 is a perspective view of a part at which at which an axial position detection coil of the axial bearing wear detection device is disposed at an end part of one tooth part of the stator.

A notch groove 61b is provided near one end part 61a of a tooth part 60 of stator iron core 34 to form a small core part 61 and one axial position detection coil Cf is wound inside stator grooves 35 around this core part 61. Though not illustrated, the other axial position detection coil Cr is provided in likewise manner at the other end of tooth part 60.

Figure 4:
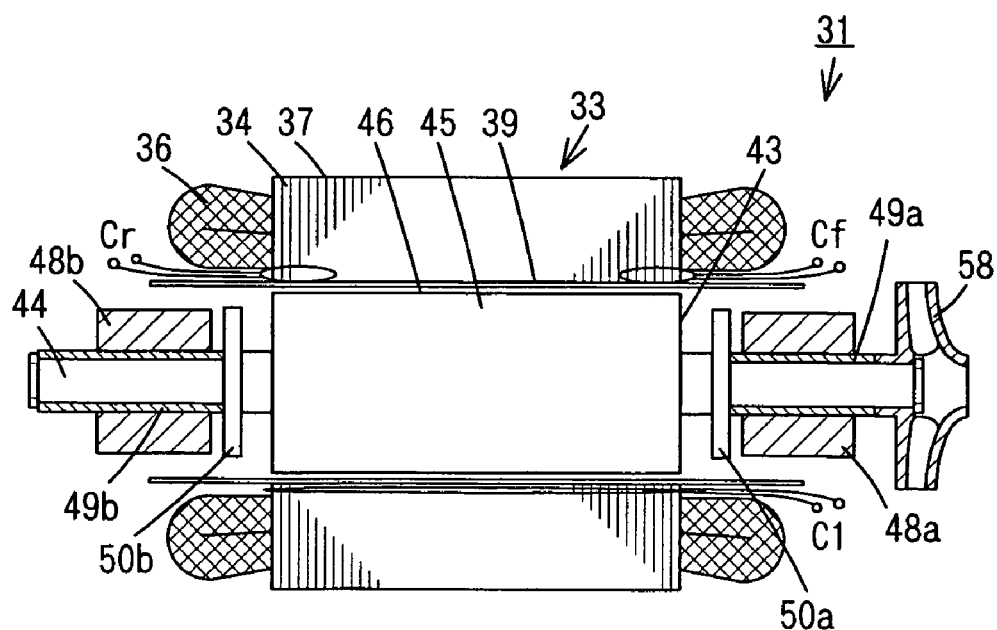
FIG. 4 is a schematic view of the canned motor pump to which the same axial bearing wear detection device is applied.
Figure 7:
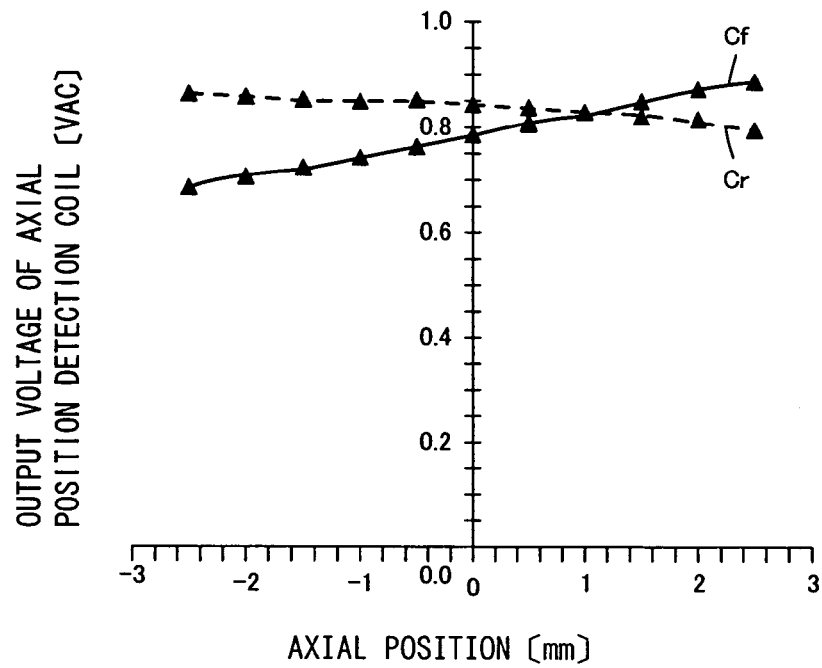
FIG. 7 is a graph showing the relationship between the voltages generated at the axial position detection coils of the prior art and the axial position of a rotor.
Figure 8:
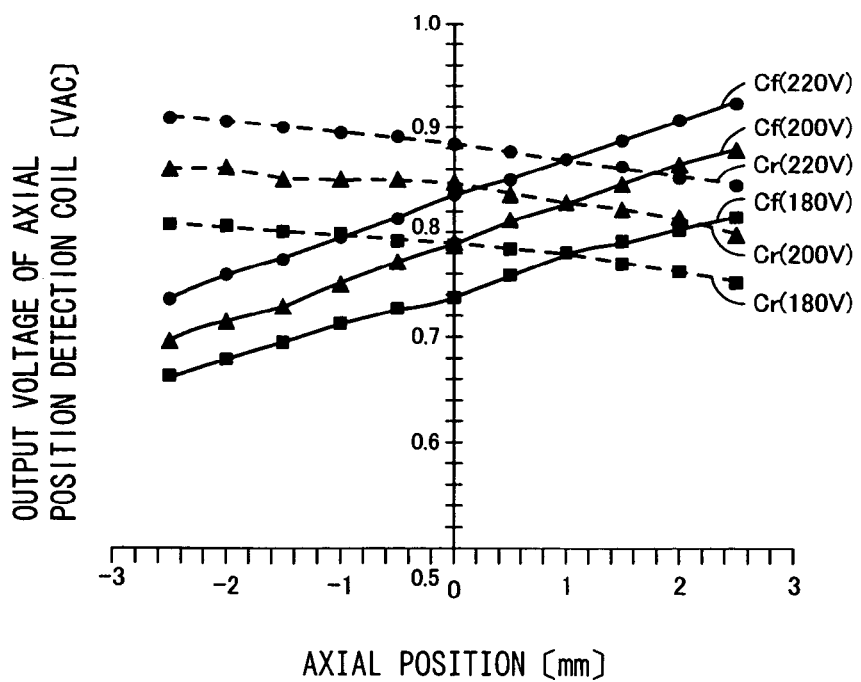
FIG. 8 is a graph showing how the voltages of FIG. 7, which are generated at the axial position detection coils, vary when the power supply voltage of a canned motor varies.

FIG. 4 is a schematic view of canned motor pump 31 to which the axial bearing wear detection device is applied. At the respective ends in the axial direction of the upper side of stator iron core 34 of canned motor 33 are installed the pair of axial position detection coils Cf and Cr for detecting the axial position of rotor 43, that is, the axial wear of bearings 48a and 48b. Also, radial position detection coil C1, for detecting the radial wear of bearings 48a and 48b, is installed at one tooth part at the lower side, and though not illustrated, another radial position detection coil C2 is disposed at one tooth part that opposes radial position detection coil C1 and these radial position detection coils are connected in series.

Here, the detection of the axial wear of bearings 48a and 48b shall be described. The pump 32 side of canned motor 33 shall be referred to as the "front side" and the side opposite pump 32 shall be referred to as the "rear side."

With regard to the movement of rotor 43 in the axial direction, movement towards the front side is restricted by the contacting of bearing 48a, at the front side at which impeller 58 is positioned, with thrust collar 50a, and opposite movement towards the rear side is restricted by the contacting of bearing 48b with thrust collar 50b.

Though the range in which rotor 43 can move freely in the axial direction in the state in which there is no axial wear of bearings 48a and 48b, that is, the play of rotor 43 differs according to the size and arrangement of pump 32, it is approximately 1 to 2 mm, and in normal operation, rotor 43 is positioned within this range of play in the axial direction.

Though in normal operation, the axial position of rotor 43 is at a position at which front side bearing 48a and thrust collar 50a rotate while in contact with each other or a position at which rear side bearing 48b and thrust collar 50b rotate while in contact with each other, the structure is such that when bearings 48a and 48b become worn by approximately 1 mm in the axial direction, the front surface or the rear surface of impeller 58 of pump 32 contacts casing 57 or bearing box 47a.

Thus in consideration of the above, for detection of the axial wear of bearings 48a and 48b, the movement of rotor 43 in the axial direction must be monitored within a range of ±2.5 mm.

And upon installing axial position detection coils Cf and Cr at the respective end parts of stator iron core 34, the axial movement of rotor 43 can be made known from the difference in the voltages generated at these axial position detection coils Cf and Cr.

FIG. 1 shows a circuit diagram of the axial bearing wear detection device.

71 is an axial wear detection part. This axial wear detection part 71 has axial position detection coils Cf and Cr, disposed at the respective end parts of stator 37, and these axial position detection coils Cf and Cr are connected in series, with intermediate part 72 being grounded.

An end part 73 of axial position detection coil Cf at the front side of stator 37 is connected via an amplifier 74 to a rectifier/smoothing circuit 75, which converts the voltage of the coil to a positive DC voltage. An end part 76 of axial position detection coil Cr at the rear side of stator 37 is connected via an amplifier 78 to a rectifier/smoothing circuit 79, which converts the voltage of the coil to a negative DC voltage. These rectifier/smoothing circuits 75 and 79 are connected to input parts of an adding amplifier circuit 80.

The voltage generated at axial position detection coils Cf and Cr are converted into positive and negative DC voltages respectively and then input into adding amplifier circuit 80. Adding amplifier circuit 80 synthesizes these DC voltages and outputs a voltage proportional to the synthesis result to output terminal 81. To output terminal 81 is connected a display device, etc., which displays the degree of axial wear corresponding to the movement direction and movement position of rotor 43 in accordance with the voltage output from adding amplifier circuit 80.

Axial position detection circuit 82 for detecting the axial position of rotor 43 relative to stator 37 from the difference in the voltages generated at axial position detection coils Cf and Cr comprises amplifiers 74 and 78, rectifier/smoothing circuits 75 and 79, adding amplifier circuit 80, etc.

To adding amplifier circuit 80 is connected an axial zero point adjustment circuit 83, which uses a voltage supply that varies in proportion to the power supply voltage of canned motor 33 as a bias power supply and adjusts to zero the voltage difference of axial position detection coils Cf and Cr at axial position detection circuit 82 when rotor 43 is at an axial direction reference position. This axial zero point adjustment circuit 83 has a variable resistor 84 for zero point adjustment, one end part 85 of this variable resistor 84 is connected to the positive output of axial position detection coil Cf at one side, another end part 86 is connected to the negative output of axial position detection coil Cr at the other side, and an intermediate point is connected to the input of adding amplifier circuit 80.

At adding amplifier circuit 80 of axial position detection circuit 82, a voltage corresponding to the axial movement of rotor 43 is output based on the difference in the voltages generated at axial position detection coils Cf and Cr that are disposed at the respective ends in the axial direction of stator 37.

At axial zero point adjustment circuit 83, the voltage difference of axial position detection coils Cf and Cr at adding amplifier circuit 80 when rotor 43 is at the axial direction reference position is adjusted to zero, using the voltage supply that varies in proportion to the power supply voltage of canned motor 33 as the bias power supply. That is, zero point adjustment is performed by means of variable resistor 84 so that the voltage output to output terminal 81 will be 0V when rotor 43 is at 0 mm, which is the mechanical center position.

FIG. 5 is a graph showing the output when voltages generated at axial position detection coils Cf and Cr are processed by the axial bearing wear detection device.

The abscissa axis of the graph indicates the axial position of rotor 43 and the ordinate axis indicates the voltage that is output to output terminal 81 of adding amplifying circuit 80.

Since the power supply of axial zero point adjustment circuit 83 is not a constant voltage power supply and the voltages generated at axial position detection coils Cf and Cr are converted to positive and negative DC voltages respectively and then used as voltages for zero point adjustment, when the power supply voltage of canned motor 33 varies and the difference voltage of axial position detection coils Cf and Cr vary, the voltage for zero point adjustment varies in likewise manner. Thus even if the power supply voltage of canned motor 33 varies, the function of zero point adjustment by axial zero point adjustment circuit 83 is not obstructed.

In the graph of FIG. 5, the outputs of adding amplifier circuit 80 are shown with the power supply voltage of canned motor 33 as a parameter, that is, the outputs for a power supply voltage of 180V, 200V, and 220V are shown. However, it was confirmed that there was hardly any deviation of the output for the 0 mm axial position.

The three curves shown in the graph do not coincide but deviate with respect to each other slightly because the magnitudes of the output voltages of the respective axial position detection coils Cf and Cr with respect to axial position vary according to the power supply voltage of canned motor 33, that is, when the power supply voltage of canned motor 33 increases, the slope of the curve decreases, and when the power supply voltage of canned motor 33 decreases, the slope of the curve increases. Deviations of such a level are within a tolerable range.

Figure 9:
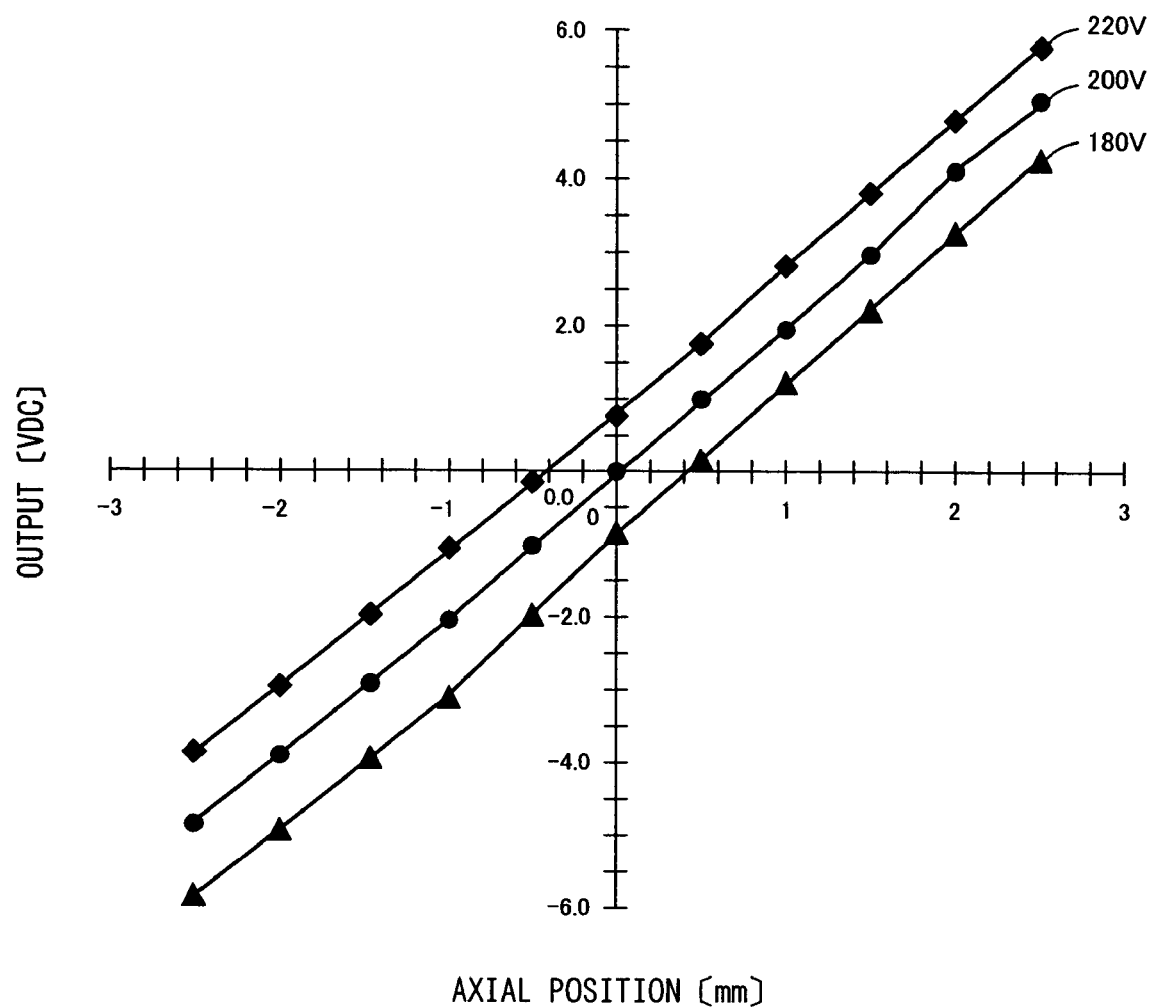
FIG. 9 is a graph showing the output when the voltages of FIG. 7, which are generated at the axial position detection coils, are processed by an axial bearing wear detection device, which includes the conventional axial zero point adjustment circuit shown in FIG. 6.

Thus in comparison to the case of the prior-art axial zero point adjustment circuit shown in FIG. 9, the influence of the variation of the power supply voltage of canned motor 33 is not received and axial bearing wear detection of high precision is enabled.

Since by means of axial zero point adjustment circuit 83, the voltage difference of axial position detection coils Cf and Cr at axial position detection circuit 82 when rotor 43 is at the axial direction reference position is adjusted to zero using a voltage supply that varies in proportion to the power supply voltage of canned motor 33 as the bias power supply as described above, even if the power supply voltage of canned motor 33 varies, the bias power supply of axial zero point adjustment circuit 83 varies in likewise manner such that the zero point adjustment by axial zero point adjustment circuit 83 is not affected and axial bearing wear detection of high precision is enabled.

Moreover, by using the voltage that is generated at one axial position detection coil Cf for the positive power supply of the bias power supply of axial zero point adjustment circuit 83 and using the voltage that is generated at the other axial position detection coil Cr for the negative power supply of the bias power supply of axial zero point adjustment circuit 83, axial bearing wear detection of high precision is enabled with a simple circuit arrangement that does not use a separate power supply.

At least one of the voltages generated at axial position detection coils Cf and Cr may be used for the power supply of axial zero point adjustment circuit 83, and even in this case, axial bearing wear detection of high precision is enabled with a simple circuit arrangement that does not use a separate power supply.

Also, the bias power supply of axial zero point adjustment circuit 83 is not restricted to the use of voltages generated at axial position detection coils Cf and Cr and another power supply that varies in voltage in conjunction with the power supply voltage of canned motor 33 may be used instead, and axial bearing wear detection of high precision is enabled in this case as well.

INDUSTRIAL APPLICABILITY

This invention's axial bearing wear detection device for canned motor enables axial bearing wear detection of high precision and in addition to application to canned motor pumps used in chemical plants, etc., this invention may be applied to various equipment that use canned motors.

The invention claimed is:

1. An axial bearing wear detection device for canned motor comprising:
    axial position detection coils, disposed at both ends in the axial direction of a stator of a canned motor having the stator and a rotor;
    an axial position detection circuit, detecting the axial position of the rotor with respect to the stator from the difference in the voltages generated at the axial position detection coils; and
    an axial zero point adjustment circuit, having a power supply source, which varies in proportion to the power supply voltage of said canned motor, as a bias power supply and adjusting to zero the voltage difference of the two axial position detection coils at said axial position detection circuit when the rotor is at a reference position in the axial direction.

2. The axial bearing wear detection device according to claim 1, wherein
    the voltage generated at least at one of the axial position detection coils is used for the bias power supply of the axial zero point adjustment circuit.

3. The axial bearing wear detection device according to claim 1, wherein
    the voltage generated at one of the axial position detection coils is used for the positive power supply of the bias power supply of the axial zero point adjustment circuit and the voltage generated at the other axial position detection coil is used for the negative power supply of the bias power supply of the axial zero point adjustment circuit.

* * * * *